Figure 1:
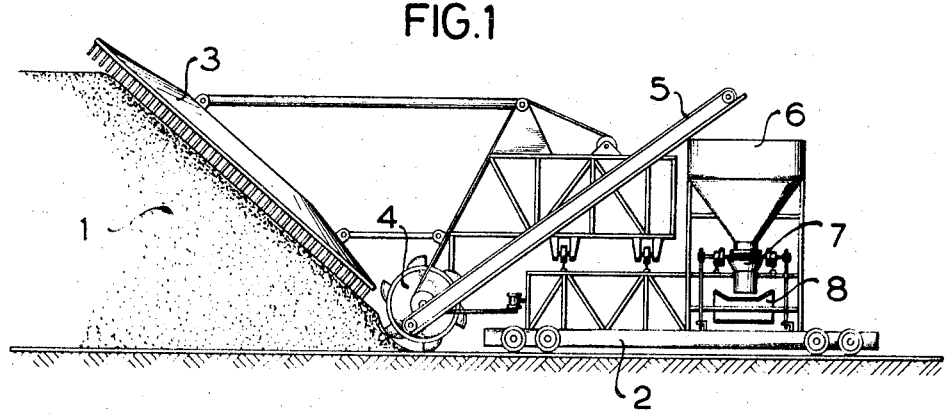

United States Patent
Smits

[15] 3,656,641
[45] Apr. 18, 1972

[54] METHOD FOR UNIFORMLY DISTRIBUTING BULK MATERIAL TAKEN FROM A STOCKPILE

[72] Inventor: Lambert Smits, Langenberg, Germany
[73] Assignee: Westfalia Dinnendahl Groppel Aktiengesellschaft, Bochum, Germany
[22] Filed: Oct. 28, 1970
[21] Appl. No.: 84,567

[30] Foreign Application Priority Data

Oct. 28, 1969 Germany ................P 19 54 105.0

[52] U.S. Cl. ..................................214/152, 198/36, 214/10, 214/17 G
[51] Int. Cl. .......................................................B65g 65/28
[58] Field of Search ..................214/10, 17 CX, 152; 198/36, 198/44, 47, 48, 56, 57

[56] References Cited

UNITED STATES PATENTS 3,306,476  2/1967  McMillan ...............................214/10

FOREIGN PATENTS OR APPLICATIONS 1,054,377  4/1959  Germany .................................198/56

Primary Examiner—Gerald M. Forlenza
Assistant Examiner—Frank E. Werner
Attorney—Curt M. Avery, Arthur E. Wilfond, Herbert L. Lerner and Daniel J. Tick

[57] ABSTRACT

Method of uniformly distributing bulk material reclaimed from an elongated stockpile includes clearing bulk material from a section of the stockpile and raising the bulk material with a single clearing device capable of traveling transversely to the stockpile and mounted on a bridge movable in longitudinal direction of the stockpile, delivering the material raised by the clearing device to a bin extending substantially over the width of the stockpile and depositing in the bin, respectively, the material corresponding to the cleared section of the stockpile, and discharging the material at adjusted flow rates from the bin through a plurality of discharge devices located at the bottom and extending along the length of the bin, so as to deposit the quantities of the bulk material corresponding to the respective cleared sections of the stockpile at rates commensurate with their respective volumes on a common discharge belt underlying the plurality of discharge devices; and apparatus for carrying out the foregoing method.

2 Claims, 3 Drawing Figures

PATENTED APR 18 1972 3,656,641

METHOD FOR UNIFORMLY DISTRIBUTING BULK MATERIAL TAKEN FROM A STOCKPILE

The invention relates to method of distributing bulk material reclaimed from a stockpile, and apparatus for carrying out the method.

As is generally known, stockpiles are formed or built by piling the bulk material with an unloading device in superimposed parallel layers into an elongated heap. Reclaiming of the bulk material from the heaped-up stockpile is then effected at an end of the stockpile by a clearing or reclaiming device formed, for example, of a scraper, a bucket chain or the like, which is capable of traveling in the longitudinal direction of the stockpile. Pick-up devices such as power shovels, clamshell cranes, or the like, are coordinated with these clearing or reclaiming devices, and drop the bulk material stripped from the stockpile onto a belt conveyor running parallel to the end face of the stockpile, the belt conveyor, in turn, delivering the material to a stationary conveyor extending along the length of the stockpile.

It is an object of the invention to provide method and apparatus for uniformly distributing bulk material taken from a stockpile which provide a uniform distribution considerably improved over the distribution attainable by heretofore known methods and apparatuses of this general type, while at the same time reducing the cost of the apparatus.

With the foregoing and other objects in view, there is provided in accordance with the invention, method of uniformly distributing bulk material reclaimed from an elongated stockpile which comprises clearing bulk material from a transverse section of the stockpile and raising the bulk material with a single clearing device capable of traveling transversely to the stockpile and mounted on a bridge movable in longitudinal direction of the stockpile, delivering the material raised by the clearing device to a bin extending substantially over the width of the stockpile and depositing in the bin, respectively, the material corresponding to the cleared section of the stockpile, and discharging the material at adjusted flow rates from the bin through a plurality of discharge devices located at the bottom and extending along the length of the bin, so as to deposit the quantities of the bulk material corresponding to the respective cleared sections of the stockpile at rates commensurate with their respective volumes on a common discharge belt underlying the plurality of discharge devices; and apparatus for carrying out the method.

In accordance with another feature of the method of the invention, at every location of the bin, the quantity of bulk material discharged per unit time corresponds to the quantity of bulk material raised by the clearing device in the corresponding transverse section of the stockpile.

According to the apparatus of the invention, the bin must therefore be of large enough dimensions to be able to contain more bulk material than the material required for a full removal sweep of the clearing device. In order to attain the desired transfer of bulk material in accordance with another feature of the apparatus of the invention, the bin is provided with a multiplicity of discharge devices, each of which is adjustable proportionately to the quantity of bulk material accummulating from the corresponding section of the stockpile.

After adjustment of these discharge devices, they are actuated in common, in accordance with a further feature of the invention, so that the bulk material from the bin is deposited in a uniform layer on a discharge belt underlying the discharge devices.

Other features which are considered as characteristic for the invention are set forth in the appended claims.

Although the invention is illustrated and described herein as method and apparatus for uniformly distributing bulk material taken from a stockpile, it is nevertheless not intended to be limited to the details shown, since various modifications may be made therein without departing from the spirit of the invention and within the scope and range of equivalents of the claims.

Figure 2:
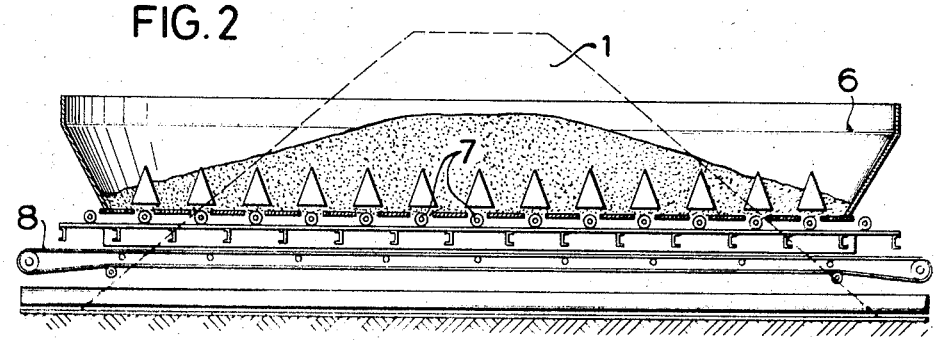
Figure 3:
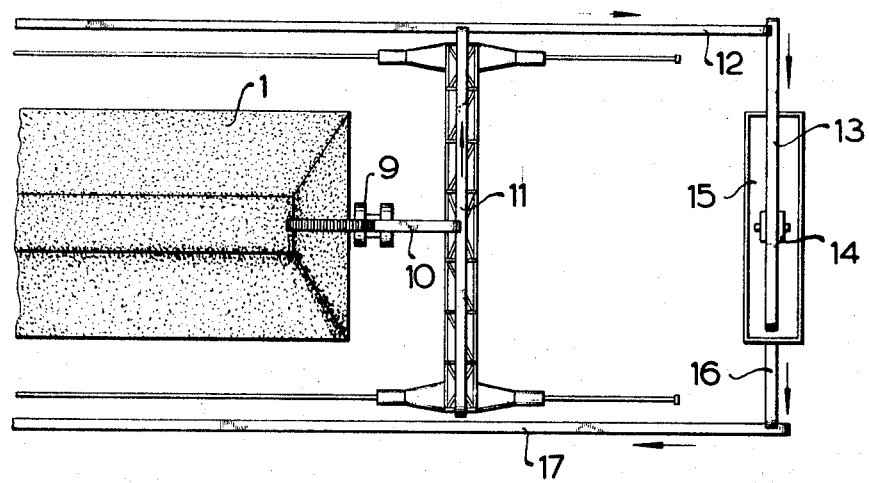

The invention, however, together with additional objects and advantages thereof, will be best understood from the following description when read in connection with the accompanying drawing, in which:

FIGS. 1 and 2 are side and rear elevational views, respectively, of apparatus constructed in accordance with the invention, for uniformly distributing bulk material reclaimed from an elongated stockpile, the apparatus including a bin and a clearing device capable of traveling together in longitudinal direction of the stockpile; and FIG. 3 is a top plan view of another embodiment of the apparatus of FIGS. 1 and 2 having a stationary bin.

Referring now to the drawing, and first particularly to FIGS. 1 and 2 thereof, there is shown an elongated stockpile 1 of bulk material such as crushed stone, sand, gravel, coal, metal ores and the like. In accordance with the invention, the device reclaiming the bulk material from the stockpile 1 includes a bridge capable of traveling in the longitudinal direction of the stockpile 1, i.e. horizontally in the plane of the drawing of FIG. 1. The bridge 2 carries on a side thereof facing an end face of the stockpile 1 a trimmer or scraper 3, a bucket wheel 4 and a conveyor belt 5 which are capable of traveling together on the bridge 2 in a direction transverse to the longitudinal direction of the stockpile 1. On the rearward side of the bridge 2, i.e. at the right-hand side of FIG. 1, a bin 6 is located which extends over the width of the stockpile 1, as seen more clearly in FIG. 2. Bulk material deposited in the bin 6 is discharged through a multiplicity of discharge devices 7 which extend along the length of the bin 6, at the bottom thereof onto a discharge belt 8 located below the bin 6 and the discharge devices 7.

The operation of the apparatus is as follows:

The scraper 3 loosens the bulk material in a section at the end face of the stockpile 1 corresponding to the working width of the bucket wheel 4. The bulk material that has slid down to the foot of the stockpile 1, is then delivered with the aid of the bucket wheel 4 to the conveyor belt 5 which throws the bulk material corresponding to the cleared section of the stockpile 1 into the bin 6. Due to the trapezoidal cross section of the stockpile 1, the quantity of the bulk material cleared in each section of the stockpile is variable; therefore, the bin 6 is filled with bulk material to varying levels. In order to be able, therefore, to attain good uniform distribution of the bulk material on the discharge belt 8, the discharge devices 7 of the bin 6 must be so adjusted, respectively, that a quantity corresponding to the respective section of the stockpile 1 can be discharged therefrom. The quantity of bulk material deposited on the discharge belt 8 is consequently largely distributed uniformly, each of the quantities of the bulk material corresponding to the respective cleared sections of the stockpile being deposited at flow rates commensurate with their respective volumes. The discharge devices 7 may be of conventional construction, suitable means being provided thereon for varying the flow cross section of bulk material therethrough so as to thereby vary the flow rate of the bulk material in accordance with the quantity of bulk material taken from a respective section of the stockpile 1.

In the second embodiment of the apparatus of the invention as shown in FIG. 3, there is provided a self-propelled clearing device 9 located in front of an end face of a stockpile 1 and including a conveyor belt 10 corresponding to the conveyor belt 5 of the embodiment of FIG. 1. Instead of delivering the bulk material directly to a bin as in the embodiment of FIG. 1, the conveyor belt 10 of the embodiment of FIG. 3 delivers the bulk material to a conveyor belt 11 which conveys the material in the direction of the associated arrows transversely to the longitudinal direction of the stockpile 1. The conveyor belt 11 is capable of traveling as a whole on rails, shown diagrammatically as horizontal lines in FIG. 3, in the longitudinal direction of the stockpile 1. The conveyor belt 11 drops the material conveyed thereby onto a conveyor belt 12 which runs in longitudinal direction of the stockpile 1. In turn, the conveyor belt 12 transfers the bulk material carried thereby to a risingly inclined conveyor belt 13, extending transversely to the conveyor belt 12 over a stationary bin 15. As in the embodiment of FIG. 1, the bin 15 of the embodiment of FIG. 3 is provided with a multiplicity of discharge devices (not shown in FIG. 3) through which the bulk material deposited in the bin 15 is discharged onto a discharge belt 16 located thereunder. The discharge belt 16 throws the bulk material onto a conveyor belt 17 extending in longitudinal direction of the stockpile 1 and is carried away by the conveyor belt 17. A throw-off carriage is provided for the conveyor belt 13 and travels therealong in synchronism with the clearing device 9 in order to maintain the same deposition of the bulk material as mentioned hereinabove with respect to the bin 6 of the embodiment of FIG. 1.

I claim:

1. Method of uniformly distributing bulk material reclaimed from an elongated stockpile which comprises clearing bulk material from a section of the stockpile and raising the bulk material with a single clearing device capable of traveling transversely to the stockpile and mounted on a bridge movable in longitudinal direction of the stockpile, delivering the material raised by the clearing device to a bin extending substantially over the width of the stockpile and depositing in the bin, respectively, the material corresponding to the cleared section of the stockpile, and discharging the material at adjusted flow rates from the bin through a plurality of discharge devices located at the bottom and extending along the length of the bin so as to deposit the quantities of the bulk material corresponding the respective cleared sections of the stockpile at rates commensurate with their respective volumes on a common discharge belt underlying the plurality of discharge devices.

2. Method according to claim 1 wherein, at every location of the bin, the quantity of bulk material discharged per unit time corresponds to that quantity of bulk material that is cleared by the clearing device in a corresponding section of the stockpile.

* * * * *